May 15, 1923.
M. F. RIDDLE
NUT CRACKING MACHINE
Original Filed Nov. 20, 1919
1,455,449
Fig. 1.
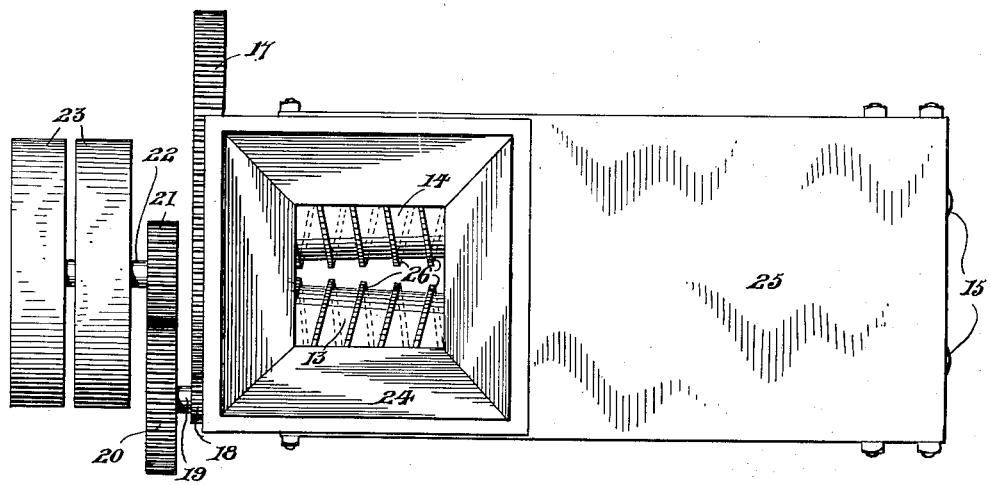
Fig. 2.
Fig. 3.
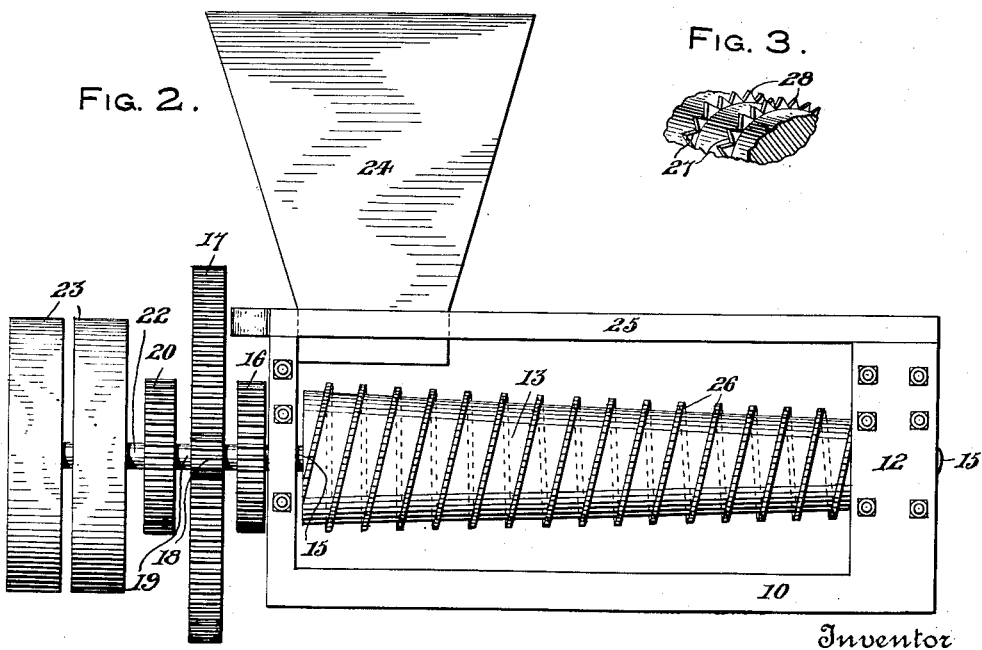
Inventor
M. F. Riddle
By F. W. Bryant
Attorney.

Patented May 15, 1923.

1,455,449

UNITED STATES PATENT OFFICE.

MAXWELL F. RIDDLE, OF RAVENNA, OHIO.

NUT-CRACKING MACHINE.

Application filed November 20, 1919, Serial No. 339,429. Renewed November 11, 1922. Serial No. 600,474.

*To all whom it may concern:*

Be it known that I, MAXWELL F. RIDDLE, a citizen of the United States of America, residing at Ravenna, in the county of Portage and State of Ohio, have invented certain new and useful Improvements in Nut-Cracking Machines, of which the following is a specification.

The primary object of my invention is the provision of a machine adapted for cracking nuts and especially palm-nuts easily and quickly regardless of the size thereof, the machine possessing great strength and being simple in construction.

A further object of my invention is to provide a machine adapted for receiving nuts from a grader for cracking the same with the best results desired, the machine being operated at different speeds when desired, and being self-feeding as well as self-cleaning.

A still further object of my invention is to provide a cracking machine for different sized nuts, that is inexpensive and easy to manufacture and capable of easily and quickly cracking large quantities of nuts, automatically fed through the machine, during the operation thereof.

With these general objects in view and others that will appear as the nature of the invention is better understood, the same consists in the novel combination and arrangement of parts hereinafter more fully described, in connection with the accompanying drawings, and in which like reference characters designate corresponding parts throughout the several views.

In the drawings,

Figure 1 is a top plan view of the invention ready for use,

Figure 2 is a side elevation thereof, and

Figure 3 is a detail perspective view of a portion of one of the rolls illustrating the nut-feeding teeth thereon.

It being understood that my invention is primarily designed for cracking palm-nuts, the same may be also utilized for cracking different kinds of nuts, in a similar manner.

Referring more in detail to the drawing, a main frame or body 10 is provided, and is herein illustrated as comprising opposite ends 11 and 12 with tapered crushing rolls 13 and 14 journalled longitudinally between the ends 11 and 12 by means of the longitudinal shafts 15, which are positioned parallel and supported in journalled relations upon the ends 11 and 12, in any desired manner.

Meshing gears 16 upon the shafts 15 adjacent the end 11 of the frame 10 cause the rolls 13 and 14 to revolve downwardly and inwardly toward each other during the cracking operation. A large gear 17 upon the shaft 15, of the roll 14, meshes with a pinion 18 carried by stub shaft 19 in a mounting not shown, while a gear 20 upon the shaft 18, meshes with a gear 21, upon a shaft 22 furnished with belt-pulleys 23, for revolving the gears 16 and shafts 15, in a manner that will be readily apparent.

The cracking rolls 13 and 14 taper away from the end 11, toward the end 12, of the frame 10, bringing the enlarged portions thereof closer together adjacent the end 11, and a hopper 24 for receiving the nuts to be cracked, is preferably mounted adjacent that end of the machine. A top plate 25 may be provided upon the frame 10, with the hopper 24 projecting therethrough, and it will be apparent that the nuts from the hopper 24 will pass onto the rolls 13 and 14, being cracked thereby and passing downwardly beneath the said rolls through the open bottom of the frame 10.

A helical rib 26 encircles each of the rolls 13 and 14, from one end to the other, of the machine, these ribs or corrugations being right and left spirals upon the adjacent rolls, and as the nuts pass between said rolls 13 and 14 they are given a slight twist while being cracked between the rolls. Grooves 27 are cut in the ribs 26 preferably by a milling machine, in planes parallel with the axial shafts 15 of the rolls 13 and 14, whereby the rib of each roll is divided into equally spaced teeth 28, similar in shape to saw teeth of tented form. This manner of producing the teeth 28 upon the spiral ribs 26 forms the successive teeth in helical arrangement, around the rolls from the larger to the smaller ends thereof, with the individual teeth positioned in planes radial of the rolls, through the axes or journalling shafts 15 thereof.

The complete operation of the invention will be fully understood from this detailed description thereof, the toothed ribs 26 feeding the nuts longitudinally of the rolls for cracking at points between the rolls where the space therebetween permits such operation when the teeth drag the nuts between the inwardly revolving rolls 13 and 14.

While the form of the invention herein set forth is believed to be the preferable embodiment of my invention, it will nevertheless be understood that minor changes may be made therein without departing from the spirit and scope of my invention.

Having thus described my invention, what I claim as new and desire to secure by Letters Patent is:—

1. A nut-cracker comprising tapered rolls journaled upon parallel axes adapted for revolution toward each other, and teeth surrounding the rolls in continuous spiral lines with the adjacent convolutions of the spiral relatively close together standing in planes radially thereof.

2. A nut-cracker comprising a frame, tapered rolls journaled upon parallel axes within the frames, adapted for the reception of nuts to be cracked, downwardly between the rolls, and successive saw teeth arranged in continuous spirals surrounding the rolls with successive convolutions of the spirals relatively closely spaced for feeding the nuts between the rolls during the cracking of the nuts by the rolls.

3. A nut-cracker comprising a frame, tapered rolls journaled therein, with the larger ends of the rolls adjacent one end of the frame, and the smaller ends of the rolls adjacent the other end of the frame, means for revolving the rolls inwardly toward each other, during the nut-cracking operation, a plurality of spirally positioned teeth surrounding the rolls and spaced relatively close longitudinally of said rolls between the ends thereof, and a nut-feeding hopper mounted over the enlarged ends of the rolls.

4. A nut-cracker comprising tapered rolls journaled in spaced relations upon parallel axes with the larger ends of the rolls adjacent one end of the machine, right and left spiral ribs upon said respective rolls extending from one end to the other thereof, and equally spaced notches throughout the ribs.

5. A nut-cracker comprising a frame, parallel shafts journaled longitudinally within the frame, tapered rolls axially mounted upon said shafts, with their larger ends at one end of the frame, and toothed ribs spirally arranged around the rolls from end to end thereof, the convolutions of the spirals being relatively close longitudinally of the rolls, said teeth engaging the nuts to crack the same and the spirals being adapted for feeding the nuts toward the smaller ends of the rolls during the cracking operation.

In testimony whereof I affix my signature.

MAXWELL F. RIDDLE.